(12) United States Patent
Ganeshmani

(10) Patent No.: US 10,853,513 B1
(45) Date of Patent: Dec. 1, 2020

(54) DATA STORAGE USING IMAGE OBJECTS SHOWN IN A REAL-TIME VIEW

(71) Applicant: Capital One Services, LLC, McLean, VA (US)

(72) Inventor: Jayaraman Ganeshmani, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/525,775

(22) Filed: Jul. 30, 2019

(51) Int. Cl.
| | |
|---|---|
| H04L 29/06 | (2006.01) |
| G06F 21/62 | (2013.01) |
| G06F 3/0484 | (2013.01) |
| G06F 21/36 | (2013.01) |
| G06K 9/62 | (2006.01) |
| G06F 3/0481 | (2013.01) |

(52) U.S. Cl.
CPC ........ *G06F 21/6218* (2013.01); *G06F 3/0481* (2013.01); *G06F 3/0484* (2013.01); *G06F 21/36* (2013.01); *G06K 9/6267* (2013.01)

(58) Field of Classification Search
CPC .... G06F 21/6218; G06F 21/36; G06F 3/0481; G06F 3/0484
USPC ......................................................... 726/18
See application file for complete search history.

(56) References Cited

U.S. PATENT DOCUMENTS

| | | | |
|---|---|---|---|
| 9,946,731 B2 * | 4/2018 | Gritton | G06F 3/0346 |
| 9,948,659 B2 | 4/2018 | Harple et al. | |
| 10,142,496 B1 | 11/2018 | Rao et al. | |
| 10,187,210 B2 | 1/2019 | Melzer | |
| 10,200,868 B1 | 2/2019 | Young et al. | |
| 10,223,710 B2 | 3/2019 | Purves et al. | |
| 2009/0254829 A1* | 10/2009 | Rohde | H04M 1/7255 |
| | | | 715/727 |
| 2013/0185673 A1* | 7/2013 | Cai | G06F 3/0481 |
| | | | 715/790 |
| 2018/0176459 A1* | 6/2018 | Choi | G06F 1/16 |
| 2019/0272336 A1* | 9/2019 | Ciecko | G06F 16/5854 |

* cited by examiner

*Primary Examiner* — Evans Desrosiers
(74) *Attorney, Agent, or Firm* — Sterne, Kessler, Goldstein & Fox P.L.L.C.

(57) ABSTRACT

Disclosed herein are system, method, and computer program product embodiments for storing files in a storage location that is associated with an image object that is displayed in a real-time view on a mobile device. Examples of an image object include physical objects and augmented objects. Display of the real-time view includes the image object as well as interfaces for interacting with the image object including creating a storage location associated with the image object. Moreover, security features may be based on using information associated with the image object to securely store the file, either locally on the mobile device or over a network (e.g., at a cloud-based location) using the mobile device.

20 Claims, 8 Drawing Sheets

DATA STORAGE USING IMAGE OBJECTS SHOWN IN A REAL-TIME VIEW

BACKGROUND

Data security has been and remains an important issue for users of mobile devices. A number of techniques currently exist to enable users to securely access data or files through websites such as cloud-storage websites. But lagging behind are improvements to store files in a secure manner, either locally on a mobile device or over a network using the mobile device.

BRIEF DESCRIPTION OF THE DRAWINGS/FIGURES

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 1:
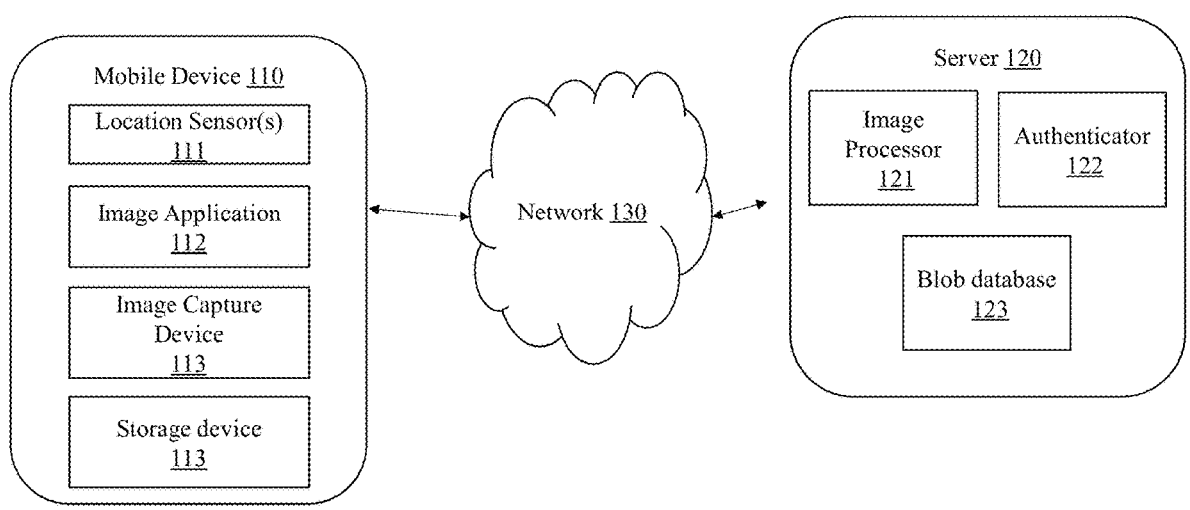
FIG. 1 depicts a block diagram of a system for implementing image oriented storage using image objects in a real-time image, according to some embodiments.

Provided herein are system, apparatus, device, method and/or computer program product embodiments, and/or combinations and sub-combinations thereof, for storing files using an image object displayed in a real-time view on a mobile device. Examples of an image object include a physical (actual) object that is displayed via the real-time view or an augmented object that is added to the real-time view via a user input. This process includes displaying the real-time view of the image object, creating a storage location associated with the image object, and using information associated with the image object to securely store the file, either locally on the mobile device or over a network (e.g., at a cloud-based location) using the mobile device. The information associated with the image object may include information about the physical object such as location information associated with the physical object and/or the mobile device and object information associated with the physical object or information about the augmented object such as spatial relationship of the augmented object to other image objects in the real-time view.

These techniques leverage improvements to technology in mobile devices—ever more sophisticated cameras, advancing imaging software, and powerful processors—to provide a novel way for securely storing files using a mobile device. These techniques provide an interface for enabling users to store files using image objects displayed in a real-time view on the mobile device. In some embodiments, the interface is part of an augmented reality application that overlays or superimposes selectable storage options over the image objects that are displayed via the interface.

These techniques provide novel methods for storing and accessing data (e.g., files) based on location and/or object specific information. As one example, car-related information (e.g., registration, insurance, maintenance records) may be stored and accessed in association with a physical object or augmented object placed within a dashboard of a vehicle when the dashboard is displayed in a real-time view of the interface. The interface identifies the dashboard as a physical object in the real-time view and provides a means for a user to interact with the dashboard in order to create a storage location, store a file in the storage location, and provide authentication options for accessing the file at that storage location. As another example, home-related information (e.g., title, insurance, home improvement documentation) may be stored and accessed in association with a physical object in the home when that physical object is displayed or with an augmented object when it is placed via user input in the real-time view of the interface.

In this manner, additional and novel layers of security may be utilized to securely store data using a mobile device. These layers include the physical object and/or augmented object, information associated with the physical object and/or augmented object, location of the physical object, the physical relationship between the mobile device and the physical object, the spatial relationship of the augmented object with other image objects, just to name a few examples. These techniques also provide novel methods for securely accessing the data from the created storage location based on these additional layers of security.

In view of the foregoing description and as will be further described below, the disclosed embodiments allow data to be stored in a storage location associated with an image object displayed in a real-time view of an interface. In particular, the process allows users to select an image object through the interface and create a storage location based on that selection. The process then enables data such as files to be stored in the created storage location. In this manner, the described embodiments result in a novel mechanism for storing and accessing files through a mobile device.

Various embodiments of these features will now be discussed with respect to the corresponding figures.

FIG. 1 depicts a block diagram of a system 100 for implementing image oriented storage using image objects in a real-time image, according to some embodiments. System 100 may include a mobile device 110, server 120, and network 130. Mobile device 110 may be connected to server 120 through network 130.

Mobile device 110 may include a device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, augmented reality headsets, etc.), or a similar type of device. In some embodiments, mobile device 110 may include a location sensor 111 used for tracking a location of mobile device 110. Examples of location sensor 111 include any combination of a global position system (GPS) sensor, a digital compass, a velocitimeter (velocity meter), and/or an accelerometer. In other embodiments, mobile device 110 may include an RFID reader that can read RFID tags situated in various locations (e.g., different rooms of a home, etc.). In another embodiment, mobile device 110 may include a bar code reader. For reading bar codes situated in various locations. In yet one more embodiment, a combination of these techniques may be used.

Location sensor 111 may work in combination with image application 112 and image capture device 113 to provide location information associated with objects detected by image application 112 and image capture device 113. Location sensor 111 may provide location information of mobile device 110 which may be used as a proxy for the physical location of objects detected by image application 112 and image capture device 113. For example, if mobile device 110 is utilized at a certain location (e.g., longitude and latitude coordinates as provided by location sensor 111), any objects that are detected at that certain location (e.g., by image application 112 and image capture device 113) are associated with that location of mobile device 110 by linking the detected object with coordinates of mobile device 110 at the time the object is detected. In an embodiment where location sensor 111 is implemented a GPS sensor, image application 112 may query location sensor 111 for GPS coordinates to image application 112 at the time the real-time view is displayed and any objects are detected within the real-time view.

Mobile device 110 may also include an image application 112 that provides a user interface for accessing image capture device 113. For example, image application 112 may be implemented as an augmented reality application that provides an interface for using image capture device 113 to display a real-time view. Image application 112 may also include an interface that allows users to interact with and otherwise select objects displayed in the real-time view provided by image capture device 113. A real-time view refers to a preview or live view that allows the display of mobile device 110 to be used as a viewfinder for taking images. In some embodiments, the real-time view may be implemented as an augmented reality viewer that provides augmented reality interfaces over objects that are displayed within the real-time view.

In some embodiments, graphical user interfaces provided by image application 112 are provided as an overlay (or overlays) within the real-time view. For example, image application 112 may display a real-time view that includes a number of different objects. Image application 112 may then also display overlay(s) (e.g., a selectable icon) over each of the objects that allow interaction with each object. In this manner, image application 112 allows for virtual selection and subsequent storage location creation associated with any of the objects that are displayed within the real-time view.

In some embodiments, image application 112 includes object detection and recognition capability for performing an analysis of the real-time view and automatically detecting object(s) in the real-time view. Detection of objects may include dynamically determining the objects that appear in the real-time view provided by image application 112 (e.g., whether the object is a glove compartment or a console) and object information associated with the detected object (e.g., spatial relationship of the object with other objects in the image, color, size, image of the object). For example, in some embodiments, image application 112 also includes optical character recognition (OCR) for detecting written text displayed in the real-time view. In some embodiments, the overlays may be automatically generated and associated with the objects as part of the object detection process. For example, a real-time view may dynamically display an icon over any detected object as they are detected; in other embodiments, the icons are displayed only upon selection of a storage mode option; in yet another embodiment the icons are displayed once the user interacts with the display.

To perform object recognition, image application 112 may capture data from image capture device 113 as images and uses a real-time object recognition function to recognize objects displayed in the real-time view. Examples of a real-time object recognition function may be provided through augmented reality toolkits such as ARToolkit and ARTag. After real-time object recognition is performed, image application 112 may provide an interface for creating storage locations via the real-time view and object recognition capability. For example, in the real-time view, image application 112 may dynamically detect objects and display, as an overlay over each object, information about the detected object. Image application 112 may also dynamically generate identifiers based on the object detection to be displayed in the real-time view. In some embodiments, the interface may provide selectable features that include selecting the object, creating a storage location (e.g., in object storage 114 and/or in object database 123), selecting data (e.g., file(s)) to be stored at the storage location, naming the storage location, just to name a few examples. These selectable features enable the storage of a selected file at the storage location based on an interaction with the object in the real-time view of image application 112.

In some embodiments, when creating a storage location associated with a physical object, image application 112 may require multiple images and/or a panoramic view of the physical object. Multiple images from different camera views and angles may be required so that subsequent access of the storage location via the physical object is not limited to only one camera angle. In the example of creating a storage location associated with the glove compartment of a car, if the storage location is created based on an image of the glove compartment taken from the driver's seat only, then subsequent access to that storage location may be limited to when the real-time view is taken from the driver's seat. This limited option may be beneficial as another security measure. As an additional option, image application 112 may require multiple images (or a panoramic image) of the glove compartment to be taken during storage location creation. These multiple images could then be stored as part of the object information. Subsequent access to the storage location may then be performed from the driver's seat or the passenger seat.

In some embodiments, when creating a storage location associated with an augmented object, image application 112 may provide an interface for interacting with an augmented object. An augmented object is a virtual object that may be selected and placed in a real-time view via user input. The interface may include functions for displaying a menu of available augmented objects, receiving a user selection of an augmented object, and receiving user input for placing the selected augmented object within the real-time view provided by image application 112. After placement of the augmented object within the real-time view, image application 112 may store object information associated with the augmented object. Object information may include location information of the augmented object which may be calculated based on estimated GPS coordinates of the augmented object. Other types of object information may include details of the augmented object and spatial relationship (e.g., estimated distance information) to other image objects shown in the real-time view.

In some embodiments, object information of augmented objects is utilized by image application 112 to remember placement of augmented objects within a real-time view. Since augmented objects are "virtual" objects and not physical like physical objects, additional processing is performed by image application 112 in order to be able to display the augmented objects in the real-time view at a later time. In other words, image application 112 must remember the placement of the augmented objects within the real-time view so that it can be displayed again during subsequent attempts to access the associated storage location. In order to display an augmented object that has been previously placed, image application 112 may maintain a database of augmented objects associated with a storage location. Image application 112 may utilize the current location of mobile device 110 to search the database for any augmented objects associated with the current location. If any are found, image application 112 may retrieve the augmented object(s) and display them in the real-time view in accordance with their respective object information.

In addition to creating storage locations, image application 112 may provide also an interface for accessing or viewing storage locations. For example, in some embodiments, image application 112 may also include an authentication capability that allows authentication features to be associated with the selected object. Example of authentication features include a password challenge (e.g., requiring a password prior to accessing or displaying the storage location) or a real-time object manipulation challenge (e.g., requiring interacting with displayed objects shown in the real-time view in a particular sequence or manner). For example, if a real-time view displays four different objects, a real-time object manipulation challenge could require interacting with those four (or less) different objects in a particular order in order to access or even display the storage location via image application 112. The interface provided by image application 112 may be used to associate an authentication feature with the storage location and also provide an option as to whether authentication features are required to display a hidden icon associated with the storage location (e.g., make an interactive icon associated with the storage location visible for access) or just accessing the storage location.

The feature of displaying the hidden icon refers to a selectable option where the icon may be initially hidden even if the object that is associated with that storage location is displayed in a real-time view of image application 112. For example, image application 112 may provide, as an overlay, a selectable icon and/or other interactive interface, over the object. Selection of the icon may bring up a menu of storage options associated with the object. In some embodiments, this selectable icon may be viewable automatically in the real-time view and access to the storage location may require an authentication feature such as the password challenge or object manipulation challenge. In other embodiments, the selectable icon may be hidden and the authentication feature may be required in order to display the selectable icon. In this manner, a third-party user would not even be aware that any storage location is present when viewing the real-time view. Hiding the selectable icon therefore provides another layer of security in protecting the data by hiding the fact that there is any data stored. Additional authentication features may then still be required when accessing the selectable icon. Accordingly, a user may add any number of layers of security when storing data using image application 112. Image application 112 may display the authentication features as options when creating the storage location.

In some embodiments, authentication features may be associated with different stages of the access. For example, as discussed, authentication features may be associated with discovering "hidden" selectable icons within the real-time view, with accessing selectable icons once they are displayed within the real-time view, for encrypting and decrypting data to be stored in the storage location. Encryption and decryption of data may be based on a physical location (e.g., GPS coordinates), a relative location (e.g., spatial relationship between mobile device 110 and the selected object), object information (e.g., size, shape, color), and information about other objects surrounding the selected object, just to name a few examples. Encryption and decryption based on these features is discussed further below.

In some embodiments, image application 112 may also include image processing capabilities to remove certain information or features from an image of the object (e.g., taken from the real-time view) to prevent the changes of false positives or negatives when later attempting to access the storage location. This processing may include removing shadow or lighting information from the object so that they do not factor into the matching process when performing the comparison between the selected object in the real-time view with the object that is stored in the storage location. As an example, storage location may be created in association with a glove compartment when the sun is out and creates shadows on the glove compartment. If the shadows are included as part the captured object information, accessing the storage location associated with that glove compartment could require the same shadows to appear on the glove compartment in order to provide subsequent access. To avoid that situation, image application 112 may remove the shadows from the image and storing that processed image of the object as object information for the created storage location. In this manner, accessing the glove compartment would not be dependent on the time of day or specific circumstances of the object when the storage location was created.

In some embodiments, image application 112 may also include an interface for allowing users to drag-and-drop data to the physical object in the real-time view in order to upload data to the associated storage location.

In some embodiments, an image capture device 113, such as a camera, includes hardware components for displaying a real-time view of the physical surroundings in which mobile device 110 is used. The image capture device 113 may support one or more image resolutions. In some embodiments, an image resolution may be represented as a number of pixel columns (width) and a number of pixel rows (height), such as 1280×720, 1920×1080, 2592×1458, 3840×2160, 4128×2322, 5248×2952, 5312×2988, or the like, where higher numbers of pixel columns and higher numbers of pixel rows are associated with higher image resolutions.

In some embodiments, image capture device 113 may be implemented using one or more camera lenses with each lens having different focal lengths or different capabilities. For example, there may be a wide-angle lens (e.g., 18-35 mm), a telephoto (zoom) lens (e.g., 55 mm and above), a lens with a depth sensor, a lens with a monochrome sensor, or a "standard" lens (e.g., 35-55 mm). Determining a depth of field may be calculated using a dedicated lens having a depth sensor or using multiple camera lenses (e.g., telephoto lens in combination with a standard lens).

In some embodiments, the determined distance or depth between image capture device 113 and the object may be used to determine a relative location of the object. The relative location of the object refers to the spatial relationship between the object and surrounding objects, such as image capture device 113. The relative location may be used in combination with the physical location to identify the object.

In some embodiments, image capture device 113 may also be used to detect the contour of objects displayed in the real-time view. Contour information for each object may be stored as object information. Some object information may be available and/or more accurate when image capture device 113 is implemented using more than one camera lens. For example, image capture device 113 implemented with three camera lenses could be more accurate in acquiring depth of field information and determining the exact relative position and contour between different objects. Contour may generally be considered to be the three-dimensional information associated with the object.

In some embodiments, implementation of image application 112 may be dependent on the number of camera lenses implemented in image capture device 113. For example, there may be one implementation of image application 112 that is configured specifically for mobile device 110 when it implements image capture device 113 with a single-lens. In this example, image application 112 could need additional functions to perform the distance calculations between image capture device 113 and the object.

As another example, there may be another implementation of image application 112 that is configured specifically for mobile device 110 when it implements image capture device 113 with multiple lenses. In this example, image application 112 may take advantage of the different capabilities of each lens in performing its object detection and analysis. For example, one lens may be configured to recognize the lighting in the real-time view and can distinguish between day and night clearly; an ultra-wide-angle lens can support wide-angle picture shooting and captures additional details regarding objects surrounding the selected object; yet another lens may be a telephoto lens which supports optical zoom to capture specific details regarding the selected object. Image application 112 may then utilize the information provided by each lens of image capture device 113 for not only identifying objects within real-time view but also securely storing and accessing data. In this manner, image application 112 may be tailored to the capabilities of mobile device 110 while still providing the complete functionality as described in this disclosure.

In some embodiments, image application 112 may use location information of an object—the physical location and/or the relative location—to encrypt or otherwise securely store data in the storage location associated with the object. Using the location information in this manner would require mobile device 110 to be in the same physical and/or relative location in order to access the storage location. Certain objects, such as stationary objects within a home or office, may be better suited for physical location encryption since those objects do not move. For example, home-related information may be stored in a storage location associated with a closet door in a bedroom; in this example, the home-related information may be encrypted using physical location of the closet door in addition to the relative location of image capture device 113 (e.g., within a certain distance) to the closet door. Objects that are mobile, such as objects within a car, may be better suited for only relative location encryption since the car can be situated in different locations. For example, it may not be desirable to store car-related information in a storage location associated with a glove compartment of a car using physical location since that would prevent accessing the car-related information at other locations (e.g., at the scene of an accident).

In some embodiments, when using location information in this manner, the current location of mobile device 110 is used as a key for encrypting and decrypting the data to be stored in the storage location. For example, when attempting to access home-related information that is stored in association with a closet door, the current location of the mobile device (e.g., longitude and latitude) may be taken from location sensor 111 and may be used as a key for decrypting the information stored in the storage location. If the current location of mobile device 110 is the same as the location that was used when storing the home-related information, then the current location would successfully decrypt the stored information. In some embodiments the encryption is performed using a hash function based on the location information (physical and/or relative) and/or object information associated with the selected physical object. The location and object information may be used in combination to generate a hash key that uniquely identifies the physical object and data that is stored in the storage location associated with the physical object.

In some embodiments, the exact location information may be required. In other embodiments, a threshold distance may be used to account for deviation from the exact location. Examples of a threshold distance include a specific distance range (e.g., +/−1 meter) or a percentage range (e.g., +/−10%) between the current location and the actual location. In the example of creating a storage location associated with a glove compartment, the threshold distance between the glove compartment and mobile device 110 may allow mobile device 110 to be within a certain range of the original distance when the storage location was created. For example, if mobile device 110 was exactly two feet from the glove compartment when the storage location is created, implementing a threshold distance allows for subsequent access to the storage location without requiring the mobile device 110 to again be exactly two feet from the glove compartment.

In some embodiments, object information (e.g., contour, size, color, shape) may also be used to securely store (e.g., by encrypting or decrypting) data. In addition to encrypting or decrypting data, object information may also be used as part of the comparison process when verifying that a selected object matches the object that is associated with the storage location. For example, when the storage location is created, an image of the physical object (provide by the real-time view) is stored as part of the creation process. When subsequent access to the storage location is requested, image application 112 needs to determine that the subsequent access is associated with the same physical object that was used to create the storage location. In some embodiments, this may be done via an image comparison between an image of the object that was stored when the storage location was created and an image of the object that is provided with the request. To account for differences in photo conditions (e.g., time of day, shadows, lighting), object information may be used as part of the comparison process in addition to the image processing discussed above. For example, the contour, size, color, and/or shape of the object may be used to in combination with the location information in order to increase confidence in matching the objects.

In some embodiments, the image capture device 113 may support a first image resolution that is associated with a quick capture mode, such as a low image resolution for capturing and displaying low-detail preview images on a display of the user device. In some embodiments, the image capture device 113 may support a second image resolution that is associated with a full capture mode, such as a high image resolution for capturing a high-detail image. In some embodiments, the full capture mode may be associated with the highest image resolution supported by the image capture device 113. In some embodiments, mobile device 110 may send the captured image, via the network 130, to the server 120 for processing and/or validating the captured image. In some embodiments, mobile device 110 may receive a message or any other type of information from the server 120, which may be displayed on mobile device 110 via an overlay or interface provided by image application 112.

In some embodiments, object storage 114 may be implemented as a memory for storing information associated with objects selected through image application 112. Object storage 114 may differ from conventional storage in that it is configured specifically to store unstructured data associated with objects as a single element within object storage 114. For example, object storage 114 may store as a single element the object itself (e.g., selected via image application 112), location information associated with the object (e.g., from location sensor 111), object information associated with the object (e.g., from image application 112), authentication information associated with the object (e.g., from image application 112), and any other user-selected options associated with the object. One example of object storage 114 may be binary large object (BLOB) storage.

Server 120 may include a server device (e.g., a host server, a web server, an application server, etc.), a data center device, or a similar device, capable of communicating with mobile device 110 via network 130. Server 120 may include image processor 121, authenticator 122, and object database 123. In some embodiments, server 120 may implemented as a plurality of servers that function collectively as a cloud database for storing data received from mobile device 110.

In some embodiments, server 120 may be used to store the information. Collectively, object processor 121 and authenticator 121 may perform the functions described above for image application 112 including processing the object information, processing requests associated with storage locations such as accessing, uploading, and deleting files, just to name a few examples. Object processor 121 processes object information provided by mobile device 110. Instead of processing object information locally in mobile device 110, mobile device 110 may send the object information to server 120 to perform the processing remotely. Examples of processing include object detection, OCR, and processing user-selected options such as storage location creation and authentication information as discussed above with respect to mobile device 110. Authenticator 121 may be used to authenticate user or location information and encrypt/decrypt data based on information provided by mobile device 110. Object database 123 stores objects and associated information. Like object storage 114, object database 123 may differ from conventional storage in that it is configured specifically to store unstructured data associated with objects as a single element.

Network 130 may include one or more wired and/or wireless networks. For example, the network 125 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Figure 2A:
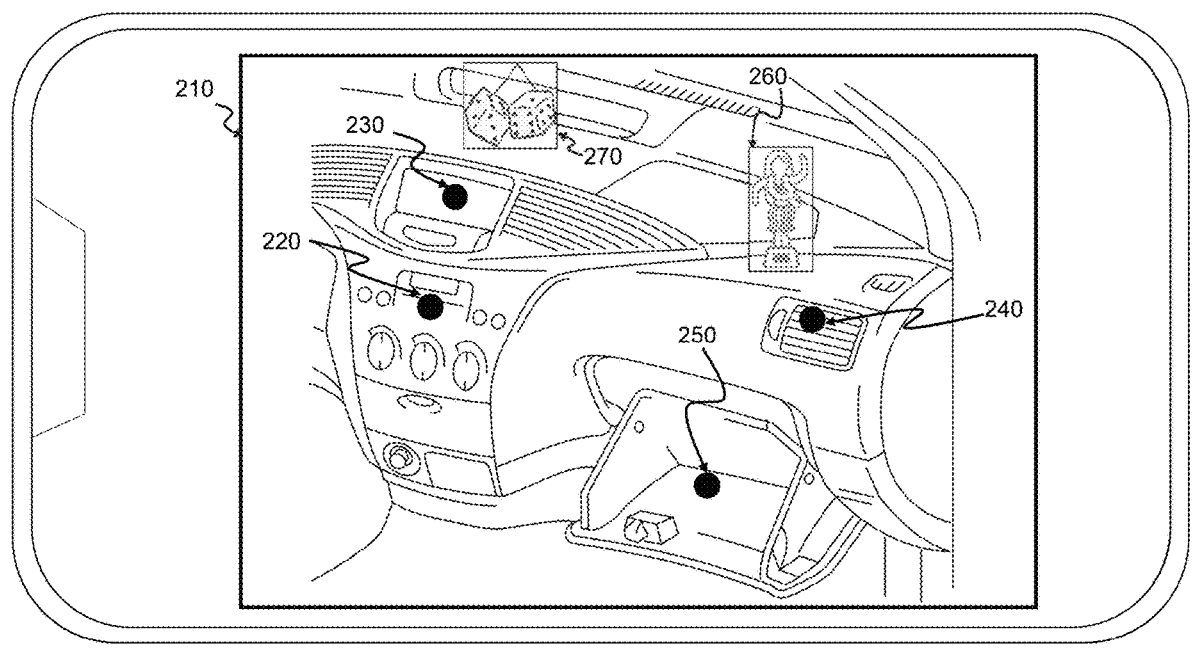
FIG. 2A depicts a block diagram of a mobile device displaying a real-time view of objects, according to some embodiments.

FIG. 2A depicts a block diagram of a mobile device 200 displaying a real-time view 210 of objects, according to some embodiments. In some embodiments, mobile device 200 represents an implementation of mobile device 110 of FIG. 1. Mobile device 200 may include a real-time view 210 (e.g., provided by image application 112). As noted above, in some embodiments, real-time view provides a preview or live view that allows the display of mobile device 200 to be used as a viewfinder.

In this embodiment, real-time view 210 may provide a view of objects within a car such as a console, radio, vent, and glove compartment. Real-time view 210 may display, as an overlay over these objects, selectable icons 220-250. Selectable icons 220-270 may be displayed as part of the storage location creation mode and/or the storage location access mode of image application 112. When displayed as part of storage location creation, selectable icons 220-250 may be displayed automatically in real-time view 210 as the physical objects (e.g., console, radio, vent, glove compartment) are detected. Selectable icons 260 and 270 may be associated with augmented objects that were placed via user input within real-time view 210. In this embodiment, selectable icon 260 is associated with a "fuzzy dice" augmented object and selectable 270 is associated with a "hula dancer" augmented object. Selection of selectable icons 220-270 may then result in a menu for enabling a user to create the storage location. When displayed as part of storage location access, selectable icons 220-270 may be displayed automatically in real-time view or after authentication (e.g., by manipulating icons 220-270 in a predefined manner). Selection of selectable icons 220-270 may result in a menu being presented to a user to interact with the storage location such as upload data, associate authentication features with the storage location, deleting data, just to name a few examples.

Figure 2B:
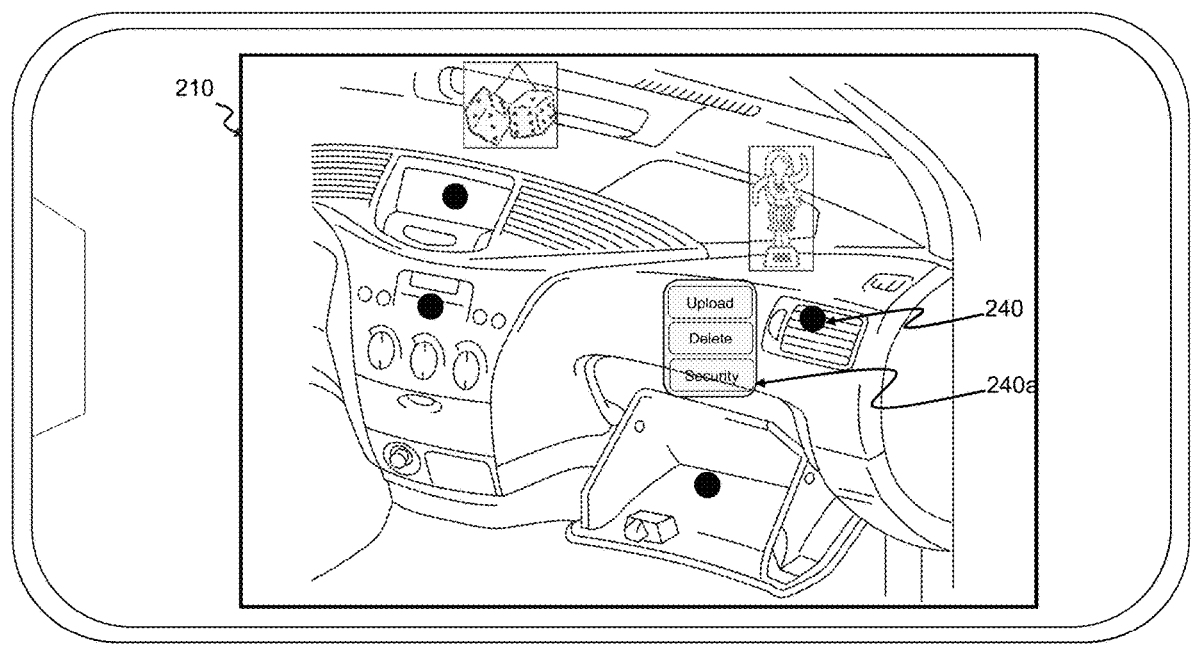
FIG. 2B depicts a block diagram of a mobile device displaying a real-time view with an overlay interface including image objects, according to some embodiments.

FIG. 2B depicts a block diagram of mobile device 200 displaying a real-time view 210 with an overlay interface 240a, according to some embodiments. Overlay interface 240a is an example of a menu that may be used to interact with the storage location and includes options for uploading data, deleting data, and adding security to the storage location. Selection of these options may result in additional menus being displayed. One example of uploading data is a drag-and-drop interface where data (e.g., any number of files) may be dragged to physical object (or its associated selectable icon) into the real-time view in order to store the data in the storage location associated with that physical object.

Figure 3:
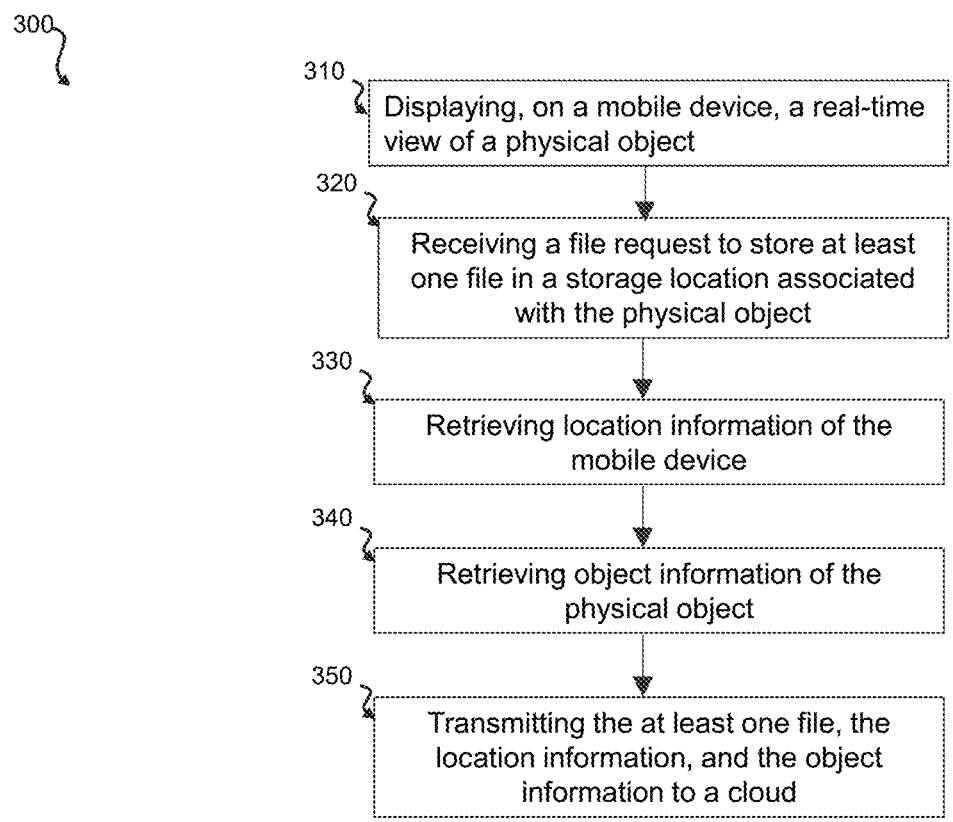
FIG. 3 depicts a flow diagram illustrating a flow for storing a file in a storage location based on a real-time view of a physical object, according to some embodiments.

FIG. 3 depicts a flow diagram of an example method 300 for storing a file in a storage location based on a real-time view of a physical object, according to some embodiments. As a non-limiting example with regards to FIGS. 1, 2A, and 2B, one or more processes described with respect to FIG. 3 may be performed by a mobile device (e.g., mobile device 110 of FIG. 1) or a server (e.g., server 120 of FIG. 1) for storing data in a storage location associated with a physical object that is displayed in a real-time view of the mobile device. In such an embodiment, mobile device 110 and/or server 120 may execute code in memory to perform certain steps of method 300 of FIG. 3. While method 300 of FIG.

3 will be discussed below as being performed by mobile device 110 and/or server 120, other devices including may store the code and therefore may execute method 300 by directly executing the code. Accordingly, the following discussion of method 300 will refer to devices of FIGS. 1, 2A, and 2B as an exemplary non-limiting embodiment of method 300. Moreover, it is to be appreciated that not all steps may be needed to perform the disclosure provided herein. Further, some of the steps may be performed simultaneously or in a different order than shown in FIG. 3, as will be understood by a person of ordinary skill in the art.

In 310, image application 112 of mobile device 110 displays a real-time view of one or more physical objects. The real-time view may be provided via an application on mobile device 110 such as image application 112. The real-time view may also include one or more overlay interfaces associated with the one or more physical objects. The overlay interfaces may include a selectable icon that provides access to options related to the storage location associated with each of the one or more physical objects.

In 320, image application 112 receives a file request to store data (e.g., at least one file) in a storage location associated with a physical object that is displayed in the real-time view. In an embodiment, the file request may be received upon interaction with an overlay interface associated with the physical object. Examples of the interaction include selection of a selectable icon that brings up a menu that displays the available options for the storage location associated with the physical object. One of these options may include requesting access to data in the storage location. Another option includes a menu for access files available on mobile device 110 that may be selected for storage and included as part of the file request. Another option is a drag-and-drop option whereby a file may be selected and dragged onto the real-time view and within a visual proximity to the icon associated with the storage location and physical object.

In 330, image application 112 retrieves current location information of mobile device 110 (e.g., from location sensor 111). As discussed above, the current location of mobile device 110 may be used as part of encrypting/decrypting data.

In 340, image application 112 retrieves any object information associated with the selected physical object. Object information may include characteristics of the physical object such as the contour, color, size, and orientation, just to name a few examples. The object information may also be used as part of securely storing data in the storage location associated with the physical object. For example, the object information may be used as part of encrypting/decrypting data and/or verifying that access to the storage location should be granted. With regard to the latter (i.e., verification), location information (e.g., physical or relative location) may be used to confirm that the relationship between mobile device 110 and the selected physical object. Object information may be used to supplement that confirmation. For example, in addition to location information, the object information, such as the color or size, may be used as a means to verify the selected physical object and to prevent attempts to subvert the authentication process by, for example, using a picture or another type of the object as a substitute for the original object.

Using the example of the glove compartment in a car to store car-related information, access to the storage location associated with the glove compartment may be based on the relative location between mobile device 110 and the glove compartment as well as object information associated with the glove compartment, such as the size, shape, color, identifying marks, and relationship with other objects within the real-time view.

In 350, image application 112 determines whether the requested data is stored locally (e.g., object storage 114) or remotely (e.g., object database 123).

If stored remotely, in 360, image application 112 transmits the file request (identifying the requested file) and the retrieved location information and object information to the remote location for further processing. If stored locally, in 370, image application 112 process the file request based on the location and object information. Examples of processing (either remotely or locally) depend on the type of authentication feature associated with the storage location. A location-based authentication feature, which would require processing the location information, requires verifying the physical location of mobile device 200 or the relative location (e.g., the distance or depth) of the selected physical object with the mobile device 200. Supplemental authentication features may rely on the object information to verify that the selected physical object is the same as the object that is stored in memory (in object storage 114 or object database 123).

Figure 4:
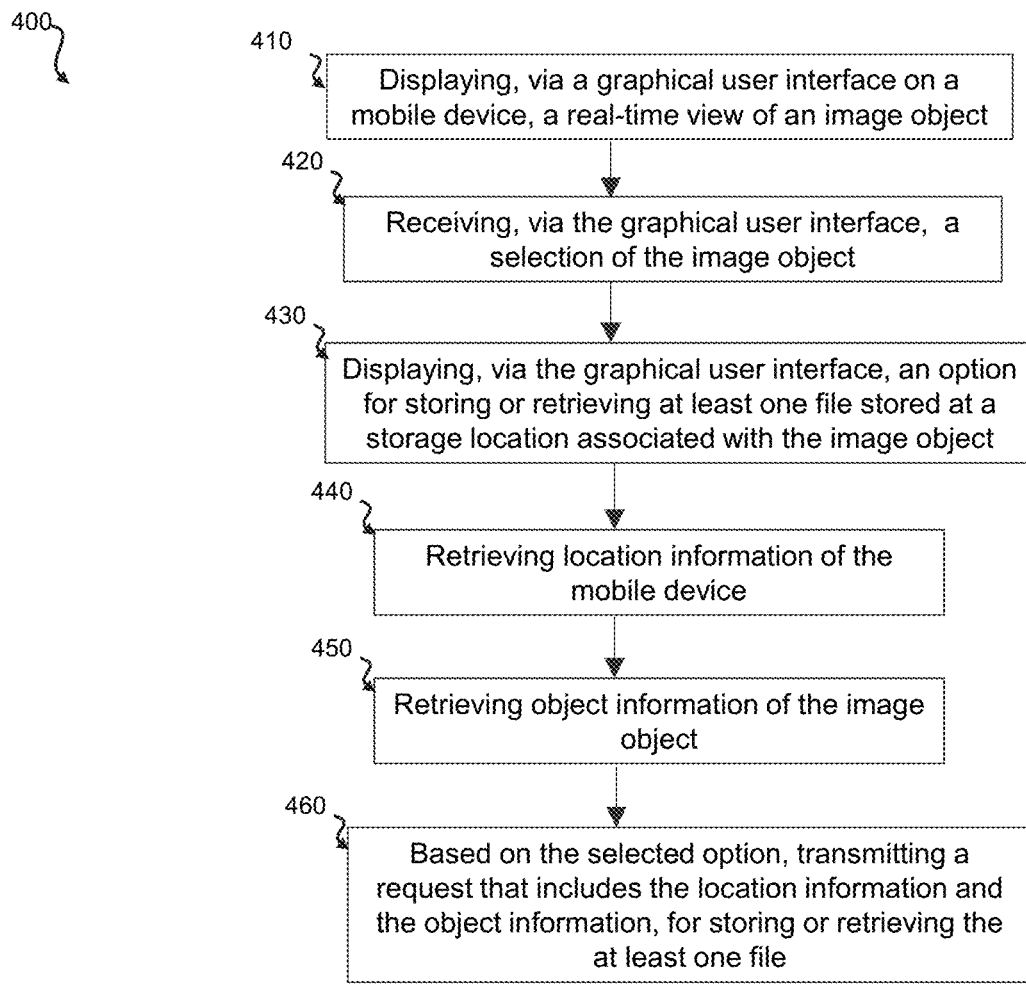
FIG. 4 depicts a flow diagram illustrating a flow for creating a storage location associated with an image object in a real-time view, according to some embodiments.

FIG. 4 depicts a flow diagram of an example method 400 for creating a storage location associated with an image object (e.g., physical object, augmented object) in a real-time view, according to some embodiments. As a non-limiting example with regards to FIGS. 1, 2A, and 2B, one or more processes described with respect to FIG. 4 may be performed by a mobile device (e.g., mobile device 110 of FIG. 1) or a server (e.g., server 120 of FIG. 1) for storing data in a storage location associated with an image object that is displayed in a real-time view of the mobile device. In such an embodiment, mobile device 110 and/or server 120 may execute code in memory to perform certain steps of method 400 of FIG. 4. While method 400 of FIG. 4 will be discussed below as being performed by mobile device 110 and/or server 120, other devices including may store the code and therefore may execute method 400 by directly executing the code. Accordingly, the following discussion of method 400 will refer to devices of FIGS. 1, 2A, and 2B as an exemplary non-limiting embodiment of method 400. Moreover, it is to be appreciated that not all steps may be needed to perform the disclosure provided herein. Further, some of the steps may be performed simultaneously or in a different order than shown in FIG. 4, as will be understood by a person of ordinary skill in the art.

In 410, image application 112 of mobile device 110 displays via a graphical user interface a real-time view of one or more image objects. The image objects may include any combination of physical objects and augmented objects. In this embodiment, any augmented objects that have been placed within the real-time view at an earlier point in time are displayed again in the location that they were placed via user input. Image application 112 "remembers" the location of any placed augmented objects via object information stored with the augmented objects. The graphical user interface may be provided as an overlay in the real-time view. The overlay interfaces may include a selectable icon that provides access to options related to the storage location associated with each of the one or more image objects.

In some embodiments, augmented objects that have been previously placed and associated with a storage location are maintained in a memory accessible to image application 112. Image application 112 may retrieve any augmented objects associated with the current location of mobile device 110 and display them in the real-time view in accordance with the object information associated with the augmented object.

In 420, image application 112 receives via the graphical user interface, a selection of the image object of the one or more image objects. For example, in FIG. 2A, selection of a physical object may include selection of any one of selectable icons 220-250 and selection of an augmented object may include selection of any one of selectable icons 260-270. Selection of the glove compartment shown in FIG. 2A would result from selection of selectable icon 250.

In 430, responsive to selecting the image object, image application 112 displays options for creating a storage location associated with the selected image object. These options may include options for uploading data to the storage location, naming the storage location, and associating one or more authentication features with the storage location.

In 440, image application 112 retrieves current location information of mobile device 110 (e.g., from location sensor 111). If selected as an option, the location information may be used for securely storing data in the storage location including encrypting/decrypting the data. In some embodiments, this step may be performed earlier in order to determine if any augmented objects need to be displayed in the real-time view.

In 450, image application 112 retrieves any object information associated with the selected image object. The object information may also be used as part of securely storing data in the storage location associated with the image object.

In 460, image application 112 creates the storage location based on the selected image object, any selected options, the location information, and the object information. One of the selected options may include an indication of whether to create the storage location locally or remotely or whether to use location information as part of encrypting or decrypting the data.

Figure 5:
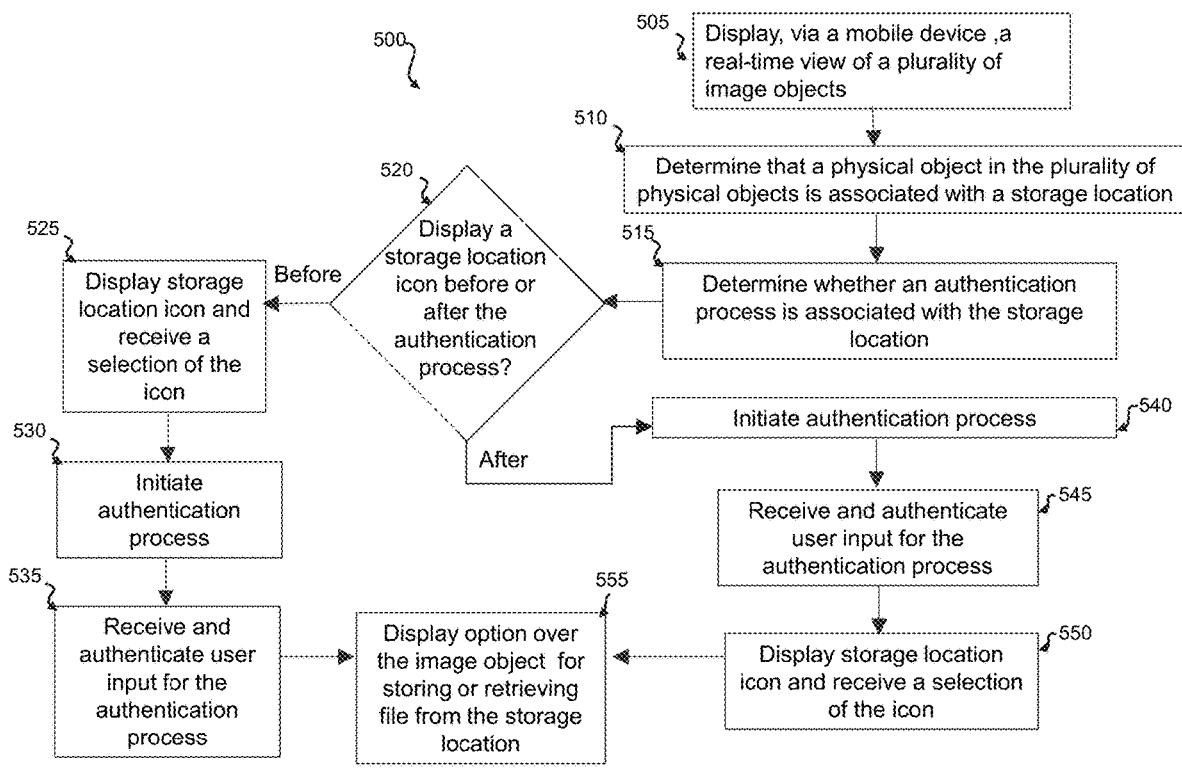
FIG. 5 depicts a flow diagram illustrating a flow of an authentication process for associating a file with an image object displayed in a real-time view, according to some embodiments.

FIG. 5 depicts a flow diagram of an example method 500 of an authentication process for associating a file with an image object displayed in a real-time view, according to some embodiments. As a non-limiting example with regards to FIGS. 1, 2A, and 2B, one or more processes described with respect to FIG. 5 may be performed by a mobile device (e.g., mobile device 110 of FIG. 1) or a server (e.g., server 120 of FIG. 1) for storing data in a storage location associated with an image object that is displayed in a real-time view of the mobile device. In such an embodiment, mobile device 110 and/or server 120 may execute code in memory to perform certain steps of method 500 of FIG. 5. While method 500 of FIG. 5 will be discussed below as being performed by mobile device 110 and/or server 120, other devices including may store the code and therefore may execute method 300 by directly executing the code. Accordingly, the following discussion of method 300 will refer to devices of FIGS. 1, 2A, and 2B as an exemplary non-limiting embodiment of method 300. Moreover, it is to be appreciated that not all steps may be needed to perform the disclosure provided herein. Further, some of the steps may be performed simultaneously or in a different order than shown in FIG. 3, as will be understood by a person of ordinary skill in the art.

In 505, image application 112 of mobile device 110 displays a real-time view of a plurality of image objects. The image objects may comprise any combination of physical objects and augmented objects. The real-time view may include one or more overlays associated with the plurality of image objects. The overlay interfaces may include a selectable icon that provides access to options related to the storage location associated with each of the plurality of image objects.

In 510, image application 112 determines that at least one of the physical objects of the plurality of image objects is associated with a created storage location. That is, this step occurs after a storage location has already been created.

In 515, image application 112 determines whether any authentication features are associated with the storage location. In an embodiment, authentication features are established with the storage location during the process of creating the storage location.

In 520, image application 112 determines whether to display a selectable icon before or after initiating the authentication feature(s) in the real-time view with the image object that is associated with the storage location. In other words, this step determines whether the selectable icon is initially hidden in the real-time view and requires authentication prior to being displayed. In some embodiments, this option is established during the process of creating the storage location. In some embodiments when the image object is an augmented object, this step includes determining whether to display the augmented object and/or the selectable icon associated with the augmented object. In this manner, image application 112 may require multiple authentication steps for accessing a storage location associated with an augmented object by first performing an authentication step to display the augmented object and a second authentication step to display the selectable icon. The number of authentication steps is adjustable such that only one authentication step may be required (e.g., the augmented object may be displayed automatically and the step may only be required to display the selectable icon).

If the selectable icon is not hidden, in 525, the selectable icon is displayed in the real-time view without any further interaction required. For example, in FIG. 2A, selectable icons 220-270 may be displayed when real-time view 210 is initially provided by image application 112. Selection of the selectable icon is also received and indicates interaction with the image object (e.g., accessing data) is desired.

In 530, authentication features (if any) associated with the storage location may then be initiated. As discussed above, examples of authentication features include a password challenge or an object manipulation challenge. In some embodiments, more than one authentication feature may be associated with the storage location. In 535, image application 112 receives and authenticates user input that is responsive to the initiated authentication feature(s).

If the selectable icon is hidden, in 540, authentication feature(s) are initiated prior to displaying the selectable icon. For example, in FIG. 2A, real-time view 210 would not display any of selectable icons 220-270 until certain authentication feature(s) have been completed based on the options selected during the storage location creation process. In other embodiments, as discussed above, the augmented object (e.g., fuzzy dice or hula dancer) may also be hidden within real-time view until an authentication step is performed.

In 545, image application 112 receives and authenticates user input that is responsive to the initiated authentication feature(s). In 550, if properly authenticated, image application 112 may then display any selectable icons associated with detected physical objects and known augmented objects shown in the real-time view. For example, in FIG. 2A, real-time view 210 would only display selectable icons 220-270 once the appropriate authentication features have been successfully completed.

In 555, after authentication features have been successfully completed and selection of the selectable icon, image application 112 displays any options associated with the image object for accessing data in the storage location. Examples of accessing data include uploading new data or retrieving data currently stored in the storage location. For example, in FIG. 2B, overlay interface 240A associated with selection of selectable icon 240 may be displayed after successful authentication of any authentication features.

Figure 6:
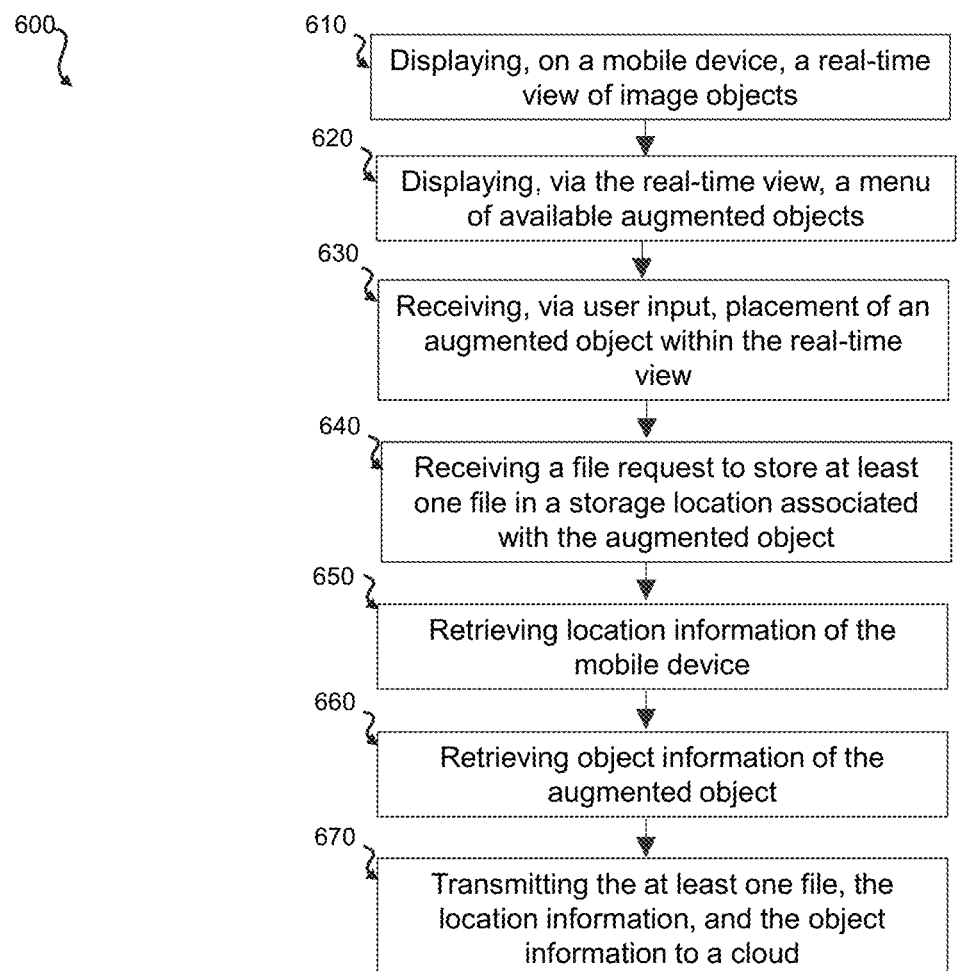
FIG. 6 depicts a flow diagram illustrating a flow for adding an augmented object to a real time view and associating a file with the augmented object displayed in a real-time view, according to some embodiments.

FIG. 6 depicts a flow diagram of an example method 600 of an authentication process for adding an augmented object to a real time view and associating a file with the augmented object displayed in a real-time view, according to some embodiments. As a non-limiting example with regards to FIGS. 1, 2A, and 2B, one or more processes described with respect to FIG. 6 may be performed by a mobile device (e.g., mobile device 110 of FIG. 1) or a server (e.g., server 120 of FIG. 1) for storing data in a storage location associated with a physical object that is displayed in a real-time view of the mobile device. In such an embodiment, mobile device 110 and/or server 120 may execute code in memory to perform certain steps of method 600 of FIG. 6. While method 600 of FIG. 6 will be discussed below as being performed by mobile device 110 and/or server 120, other devices including may store the code and therefore may execute method 300 by directly executing the code. Accordingly, the following discussion of method 300 will refer to devices of FIGS. 1, 2A, and 2B as an exemplary non-limiting embodiment of method 300. Moreover, it is to be appreciated that not all steps may be needed to perform the disclosure provided herein. Further, some of the steps may be performed simultaneously or in a different order than shown in FIG. 3, as will be understood by a person of ordinary skill in the art.

In 610, image application 112 of mobile device 110 displays a real-time view of image objects that includes physical and augmented objects. The real-time view may also include one or more overlay interfaces associated with the image objects including one or more augmented objects. The overlay interfaces may allow for selection of the one or more augmented objects as well as a menu that provides access to options related to the storage location associated with each of the one or more augmented objects.

In 620, image application 112 displays, in the real-time view, a menu of available augmented objects that may be selected via user input. The available augmented objects may be determined dynamically by image application 112 based on and related to other image objects detected within the real-time view. In the dashboard example, image application 112 detects the dashboard via object recognition and retrieves augmented reality objects associated with the dashboard. For example, in FIG. 2A, selectable icons 260 and 270 represent augmented objects selected and placed via user input. Those selectable icons may have been presented via a menu that included other augmented objects based on their association with the dashboard environment that is shown via the real-time view. Different augmented objects may be displayed based on other detected image objects. Image application 112 may make a determination of the environment based on the detected image objects. Other examples include detecting a bed and a closet and determining the real-time view is displaying a bedroom environment or a desk and a computer and determining the real-time view is displaying an office environment.

In other embodiments, all available augmented objects are displayed on the menu. In other embodiments, the augmented objects may be prioritized based on the other detected image objects in the real-time view. Augmented objects may be organized based on their relationship with the detected image objects or the determined environment. For example, instead of only showing augmented objects associated with a dashboard (such as the fuzzy dice or hula dancer), image application 112 may display organize the available augmented objects such that augmented objects related to the dashboard are shown first and the unrelated to the dashboard are shown afterward (e.g., on a different page of the menu).

In 630, image application 112 receives, via a user input, selection and placement of an augmented object from the menu. The user input may include a drag-and-drop operation where the selected augmented object (in the form of a selectable icon) is dragged from the menu to a user-specified location within the real-time view. In some embodiments, as part of this step, image application 112 may then calculate object information associated with the augmented object such as the spatial relationship between the augmented object and other detected image objects in the real-time view. The spatial relationship refers to an estimated virtual distance between the augmented object (where it is placed) and any other image objects. For example, in FIG. 2A, image application 112 may detect the virtual distance between the augmented object hula dancer as represented by selectable icon 260 and other detected image objects such as the glove compartment as represented by selectable icon 250 and the vent as represented by selectable icon 240. Object information for an augmented object may also include a physical location of the placed augmented object within the real-time view.

In 640, image application 112 receives a file request to store data (e.g., at least one file) in a storage location associated with an augmented object that is displayed in the real-time view. In an embodiment, the file request may be received upon interaction with an overlay interface associated with the augmented object. Examples of the interaction include selection of a selectable icon that brings up a menu that displays the available options for the storage location associated with the augmented object. One of these options may include requesting access to data in the storage location. Another option includes a menu for access files available on mobile device 110 that may be selected for storage and included as part of the file request. Another option is a drag-and-drop option whereby a file may be selected and dragged onto the real-time view and within a visual proximity to the icon associated with the storage location and augmented object.

In 650, image application 112 retrieves current location information of mobile device 110 (e.g., from location sensor 111). As discussed above, the current location of mobile device 110 may be used as part of encrypting/decrypting the data to be stored. In some embodiments, this step may be performed earlier to determine whether there are any augmented objects associated with the current location.

In 660, image application 112 retrieves any object information associated with the augmented object. Object information of augmented objects allows image application 112 to display placed augmented objects in the real-time at a later time. In other words, object information provides the location of placed augmented objects within a real time view.

Object information may include characteristics of the augmented object such as type, category, and name, just to name a few examples. The object information may also be used as part of securely storing data in the storage location associated with the augmented object. For example, the object information may be used as part of encrypting/decrypting data and/or verifying that access to the storage location should be granted. With regard to the latter (i.e., verification), location information (e.g., physical or relative location) may be used to confirm that the relationship between mobile device 110 and the selected augmented object. Object information may be used to supplement that confirmation. For example, in addition to location information, the object information, such as the color or size, may be used as a means to verify the selected augmented object.

Using the example of the glove compartment in a car to store car-related information, access to the storage location associated with the fuzzy dice augmented object represented by selectable icon 260 may be based on the relative location between the other detected image objects in the real-time view and the fuzzy dice augmented object.

In 670, image application 112 determines whether the requested data is stored locally (e.g., object storage 114) or remotely (e.g., object database 123). If stored remotely, image application 112 transmits the file request (identifying the requested file) and the retrieved location information and object information to the remote location for further processing. If stored locally, in 370, image application 112 process the file request based on the location and object information. Examples of processing (either remotely or locally) depend on the type of authentication feature associated with the storage location. A location-based authentication feature, which would require processing the location information, requires verifying the physical location of mobile device 200 or the relative location (e.g., the distance or depth) of the selected augmented object with the other detected image objects in the real-time view.

Figure 7:
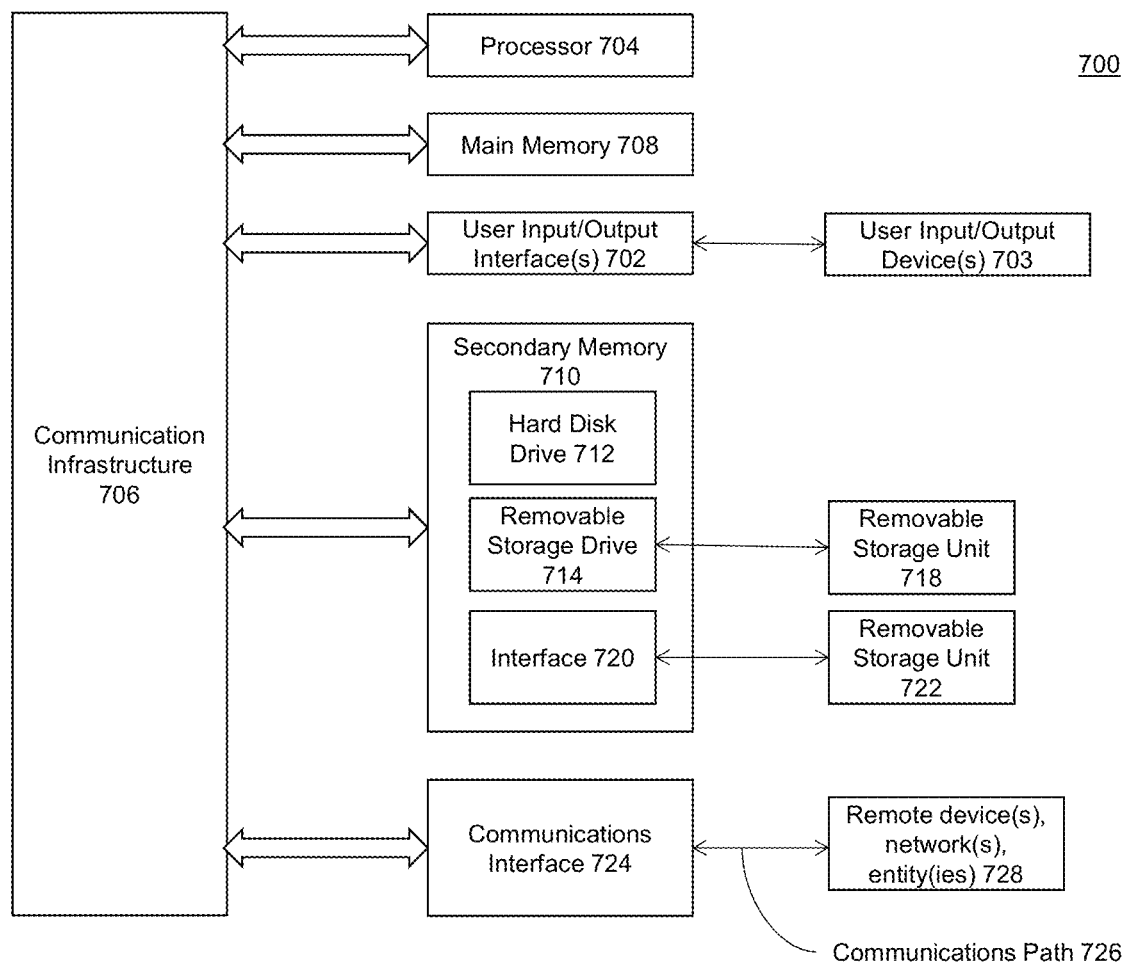
FIG. 7 depicts an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for storing at least one file using an image object displayed on a mobile device, the method comprising:
   displaying a real-time view of a plurality of image objects including the image object;
   while displaying the real-time view of the plurality of image objects:
      receiving a user input corresponding to the image object that is displayed in the real-time view;
      responsive to the user input, displaying, in the real-time view, a menu for creating a storage location associated with the image object; and
      receiving, via the menu, a file request to store the at least one file in the storage location associated with the image object;
   retrieving location information associated with the mobile device responsive to receiving the file request;
   retrieving object information associated with the image object;
   transmitting the at least one file, the location information, and the object information to a storage cloud for storage of the at least one file at the storage location based on the location information and the object information;
   receiving, via a graphical user interface, a retrieval request to retrieve the at least one file from the storage location;
   determining that an authentication process is associated with the storage location responsive to receiving the retrieval request; and
   initiating the authentication process.

2. The method of claim 1, wherein retrieving the object information comprises:
   performing object recognition on the real-time view;
   identifying, responsive to the object recognition, image information associated with the plurality of image objects in the real-time view, wherein the image information includes the object information associated with the image object; and
   wherein the user input comprises a selection of the image object, and wherein the object information includes an object identifier of the image object.

3. The method of claim 2, the method further comprising:
   receiving, while displaying the real-time view of the image object, a storage request to create the storage location associated with the image object;
   responsive to receiving the storage request, displaying, in the real-time view, the graphical user interface to receive the file request; and
   receiving, via the graphical user interface, a request to require the authentication process for retrieving the at least one file from the storage location.

4. The method of claim 3, wherein to create the storage location comprises:
   establishing an association in the storage cloud between the at least one file, the location information, and the object information.

5. The method of claim 3,
   wherein the authentication process includes at least one of a password challenge or real-time object manipulation challenge.

6. The method of claim 5, further comprising:
   receiving an input associated with the authentication process displayed on the graphical user interface;
   retrieving current location information associated with the mobile device; and
   responsive to authenticating the input and determining that the current location information matches the location information, transmitting a cloud request for retrieving the at least one file from the storage cloud.

7. The method of claim 3, further comprising:
   receiving, via the graphical user interface, the input associated with the authentication process;
   responsive to authenticating the input, displaying, via the graphical user interface, an icon as an overlay over the image object in the real-time view;

receiving, via the graphical user interface, a selection of the icon; and receiving, responsive to the selection of the icon, the retrieval request to retrieve the at least one file from the storage location associated with the image object.

8. The method of claim 1, the method further comprising:
wherein prior to transmitting the at least one file, encrypting the at least one file using the location information associated with the mobile device.

9. The method of claim 1, wherein the image object comprises at least one of a physical object or an augmented object.

10. The method of claim 1, wherein the location information comprises at least one of latitude and longitude coordinates or a relative location between the mobile device and the object, and wherein the relative location indicates a distance between the mobile device and the image object and wherein the distance is determined from an analysis of the real-time view of the image object.

11. A non-transitory computer-readable medium storing instructions, wherein the instructions, when executed by a processor, cause the processor to perform operations comprising:
displaying, via a graphical user interface on a mobile device, a real-time view of a plurality of image objects including an image object;
while displaying the real-time view of the plurality of image objects:
receiving a selection of the image object that is displayed in the real-time view;
responsive to the selection, displaying, in the real-time view, a menu for creating a storage location associated with the image object;
creating the storage location associated with the image object responsive to receiving the selection; and
receiving, via the menu and responsive to the selection of the image object in the real-time view, a file request to store at least one file in the storage location associated with the image object;
retrieving location information associated with the mobile device responsive to receiving the file request;
retrieving object information associated with the image object;
transmitting the at least one file, the location information, and the object information to a storage cloud for storage of the at least one file at the storage location based on the location information and the object information;
receiving, via the graphical user interface, a retrieval request to retrieve the at least one file from the storage location;
determining that an authentication process is associated with the storage location responsive to receiving the retrieval request; and
initiating the authentication process.

12. The non-transitory computer-readable medium of claim 11, the operations further comprising:
performing object recognition of the plurality of image objects in the real-time view; and
identifying, responsive to the object recognition, information associated with the plurality of image objects in the real-time view, wherein the information includes the object information associated with the image object.

13. The non-transitory computer-readable medium of claim 11, the operations further comprising:

responsive to creating the storage location, displaying, in the real-time view, the graphical user interface to receive the file request; and receiving, via the graphical user interface, a request to require the authentication process for retrieving the at least one file from the storage location.

14. The non-transitory computer-readable medium of claim 13, wherein to create the storage location comprises:
establishing an association in the storage cloud between the at least one file, the location information, and the object information.

15. The non-transitory computer-readable medium of claim 13,
wherein the authentication process includes at least one of a password challenge or real-time object manipulation challenge.

16. The non-transitory computer-readable medium of claim 15, wherein the real-time object manipulation challenge comprises identifying a plurality of objects displayed in the real-time view.

17. The non-transitory computer-readable medium of claim 15, the operations further comprising:
receiving an input associated with the authentication process displayed on the graphical user interface;
retrieving current location information associated with the mobile device; and
responsive to authenticating the input and determining that the current location information matches the location information, transmitting a cloud request for retrieving the at least one file from the storage cloud.

18. The non-transitory computer-readable medium of claim 12, the operations further comprising:
receiving, via the graphical user interface, an input associated with the authentication process;
responsive to authenticating the input, displaying, via the graphical user interface, an icon as an overlay over the image object in the real-time view;
receiving, via the graphical user interface, a selection of the icon; and
receiving, responsive to the selection of the icon, the retrieval request to retrieve the at least one file from the storage location associated with the image object.

19. The non-transitory computer-readable medium of claim 11, wherein the image object comprises at least one of a physical object or an augmented object.

20. An apparatus for storing at least one file using an image object displayed on a mobile device, comprising:
a memory; and
a processor communicatively coupled to the memory and configured to:
display a real-time view of a plurality of image objects including the image object;
receive, via a graphical user interface, a retrieval request to retrieve the at least one file associated with the image object;
determine that the image object in the plurality of image objects is associated with a storage location that requires an authentication process;
receive, via the graphical user interface on the mobile device and while displaying the real-time view of the plurality of image objects, an input associated with the authentication process, wherein the authentication process involves an ordered selection of at least two image objects of the plurality of image objects;
responsive to authenticating the input, display, via the graphical user interface and while displaying the real-time view of the plurality of image objects, an icon as an overlay over the image object;

receive, via the graphical user interface and while displaying the real-time view of the plurality of image objects, a selection of the icon; and display, responsive to the selection of the icon and in the real-time view of the plurality of image objects, an option for retrieving the at least one file from or storing the at least one file in the storage location associated with the image object.

* * * * *